United States Patent
Park et al.

(10) Patent No.: US 8,396,518 B2
(45) Date of Patent: Mar. 12, 2013

(54) MOBILE COMMUNICATION TERMINAL AND CONTROLLING METHOD THEREOF

(75) Inventors: Je Kwang Park, Seoul (KR); Jae Hoon Jun, Seoul (KR)

(73) Assignee: LG Electroncics Inc., Seoul (KR)

( * ) Notice: Subject to any disclaimer, the term of this patent is extended or adjusted under 35 U.S.C. 154(b) by 796 days.

(21) Appl. No.: 11/852,070

(22) Filed: Sep. 7, 2007

(65) Prior Publication Data
US 2008/0070637 A1 Mar. 20, 2008

(30) Foreign Application Priority Data

Sep. 15, 2006 (KR) .................. 10-2006-0089532
Sep. 15, 2006 (KR) .................. 10-2006-0089533

(51) Int. Cl.
*H04M 1/00* (2006.01)

(52) U.S. Cl. ............... 455/575.3; 455/550.1; 455/575.1; 455/575.4; 379/433.01; 379/433.11; 379/433.12; 379/433.13

(58) Field of Classification Search ............... 455/550.1, 455/575.3, 575.4, 575.5, 575.1; 379/433.12, 379/433.13, 433.01, 433.11
See application file for complete search history.

(56) References Cited

U.S. PATENT DOCUMENTS

| | | | |
|---|---|---|---|
| 7,590,435 B2 * | 9/2009 | Park et al. .................. | 455/575.3 |
| 7,653,422 B2 * | 1/2010 | Roberts ...................... | 455/575.4 |
| 7,672,698 B2 * | 3/2010 | Kang .......................... | 455/575.3 |
| 2004/0142735 A1 * | 7/2004 | Yi ............................... | 455/575.3 |
| 2004/0185924 A1 | 9/2004 | Hwang et al. | |
| 2004/0214621 A1 | 10/2004 | Ponce De Leon et al. | |
| 2005/0030233 A1 | 2/2005 | Kim et al. | |
| 2007/0021158 A1 * | 1/2007 | Kim et al. .................. | 455/575.3 |

FOREIGN PATENT DOCUMENTS

| | | |
|---|---|---|
| KR | 10-2000-0040790 A | 7/2000 |
| KR | 10-2001-0017827 A | 3/2001 |
| KR | 10-2003-0027512 A | 4/2003 |
| KR | 10-2003-0078465 A | 10/2003 |
| KR | 10-2004-0101567 A | 12/2004 |
| KR | 10-2006-0016369 A | 2/2006 |
| KR | 2006064997 A * | 6/2006 |

* cited by examiner

*Primary Examiner* — Raymond Dean
(74) *Attorney, Agent, or Firm* — Birch, Stewart, Kolasch & Birch, LLP

(57) ABSTRACT

A mobile communication terminal and a controlling method thereof are disclosed, by which reception performance of the mobile communication terminal can be enhanced while SAR is reduced. According to an embodiment, the terminal includes a body part comprising a circuit board having radio communication parts mounted thereon and a display to output images of prescribed information; a grounded part for selectively grounding at least one of the circuit board and the display; and a ground controlling part configured to enable at least one of the circuit board and the display to be selectively connected to the grounded part for grounding.

8 Claims, 9 Drawing Sheets

MOBILE COMMUNICATION TERMINAL AND CONTROLLING METHOD THEREOF

This application claims the priority benefit of the Korean Patent Application Nos. 10-2006-0089532, filed on Sep. 15, 2006, and 10-2006-0089533 filed on Sep. 15, 2006, which are hereby incorporated by reference as if fully set forth herein.

BACKGROUND OF THE INVENTION

1. Field of the Invention

The present invention relates to a mobile communication terminal, and more particularly, to a mobile communication terminal and a controlling method thereof. Although the present invention is suitable for a wide scope of applications, it is particularly suitable for enhancing wireless communication performance in a manner of reducing influence of electric waves through grounding.

2. Discussion of the Related Art

Generally, a mobile communication terminal is conveniently carried by a user and enables the user to exchange various kinds of information of video, audio, character, and the like with a correspondent user via wireless communication or enables the user to be provided with various services by accessing a prescribed server. As an example of the mobile communication terminal, there is a mobile phone, a PDA (personal digital assistant), or the like.

The mobile communication terminal and more particularly, the mobile phone has evolved from an early bar type into a flip type, a folder type, and a slide type in sequence.

The mobile communication terminal conducts wireless communication for making a phone call or performing data communication. The mobile communication terminal eventually generates considerable electromagnetic waves from various electronic parts mounted on a printed circuit board inside or from an antenna. Specifically, in case of making a phone call, a user is very close to the mobile communication terminal or from comes into contact with the mobile communication terminal. As a result, there is a problem that the electromagnetic waves may affect the user negatively.

SAR defines a reference for a rate of electromagnetic waves absorbed in a human body. SAR is an abbreviation for Specific Absorption Rate, i.e., a rate of electromagnetic waves absorbed in a human body. The reduction of SAR becomes a main task to be settled by the mobile communication terminal.

To address the problem of the electromagnetic waves affecting the human body, SAR can be reduced by grounding the electronic parts within a terminal.

FIG. 1 is a layout of a folder type mobile communication terminal according to a related art, in which a structure for grounding is shown.

Referring to FIG. 1, the mobile communication terminal according to the related art includes a terminal body 10 and a folder 20 rotatably assembled to one end portion of the terminal body 10.

A PCB (printed circuit board) 11, on which various electronic parts are mounted which generate electromagnetic waves, is provided within the terminal body 10. And, an LCD (liquid crystal display) 21 is provided to the folder 20 to output an image of prescribed information. Reference number '22' indicates a window for viewing the LCD 21 externally.

Both of the PCB 11 and the LCD 21 emit considerable quantities of electromagnetic waves.

The related art mobile communication terminal further includes a hinge 13 provided to one side of the terminal body 10 to enable the folder 20 to rotate against the terminal body 10, and a prescribed-size conductive plate 12 contacted with one side of the hinge 13.

The PCB/LCD 11/21 is always electrically connected to the conductive plate 12 or the conductive plate 12 and the hinge 13 for ground connection at all times. Thus, the strength of electric field within the terminal is decreased to reduce SAR, which on the other hand can reduce the communication performance of the terminal.

For instance, when the terminal is closed or when an output power is not considerably high during the use of the terminal, good transceiving can be sufficiently performed in an intense electric field area providing an excellent mobile communication environment or a medium electric field area, although the output of the antenna is not considerably high. So, the influence of SAR is not significant while the user is making a phone call.

However, the ground connection of the terminal considerably reduces radio communication/reception performance of the terminal, which is not desirable.

SUMMARY OF THE INVENTION

Accordingly, the present invention is directed to a mobile communication terminal that substantially obviates one or more problems due to limitations and disadvantages of the related art.

An object of the present invention is to provide a mobile communication terminal, by which reception performance of the mobile communication terminal can be enhanced while SAR is reduced.

Another object of the present invention is to provide a mobile communication terminal and a controlling method thereof, by which radio performance is enhanced by selectively cutting off a ground connection in case that the terminal is closed or that SAR is insignificant during the use of the terminal.

Another object of the present invention is to provide a mobile communication terminal and a controlling method thereof, by which SAR is reduced, by establishing a ground connection only if SAR causes a problem.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to an embodiment of the present invention includes a body part including a circuit board having radio communication parts mounted thereon and a display to output an image of prescribed information, a grounded part connectable for grounding to at least one of the circuit board and the display, and a ground controlling part configured to enable at least one of the circuit board and the display to be selectively connected for grounding to the grounded part.

Preferably, the body part according to one aspect includes a first body having the circuit board loaded therein and a second body configured to open/close the first body, the second body provided with the display.

Preferably, the body part according to another aspect includes a first body in which the circuit board and the display are provided, and a second body configured to open/close the first body.

Preferably, the body part according to another aspect is formed of a single body in which the circuit board and the display are provided.

Preferably, the mobile communication terminal further includes a conductor connected to at least one of the circuit board and the display, wherein the grounding controlling part selectively connects the conductor to the grounded part.

Preferably, the grounded part includes a hinge configured to rotate the second body against the first body, wherein the hinge is formed of a conductive material entirely or in part, wherein the grounding controlling part includes a protruding member provided to the hinge, and wherein ground connection is established by having the protruding member contacted with the conductor by a rotation of the hinge.

Preferably, the hinge according to one aspect includes a hole provided on a portion of the hinge and the protruding member includes a locking stick inserted in the hole to be projected with a prescribed length.

Preferably, the protruding member includes a protrusion provided to a portion of the hinge to be projected with a prescribed distance.

Preferably, the hinge according to another aspect includes a female screw hole provided to a portion of the hinge and the protruding member includes a male screw locked to the screwed hole by screw locking to be projected with a prescribed length.

Preferably, the locking stick further includes a stopper provided to a portion of the locking stick to fix the locking stick to the hole.

Preferably, the grounding controlling part includes at least one switch which switches a connection between the grounded part and at least one of the circuit board and the display, and a controller which controls the switch to selectively establish a ground connection or disconnection between the grounded part and at least one of the circuit board and the display.

Preferably, the mobile communication terminal further includes a detecting part connected to the controller to detect whether a high power radiation is performed in case of a user's radio communication, wherein the controller is operated if the high power radiation is performed according to the detection result of the detecting part.

Preferably, the grounding controlling part according to one aspect includes a detecting part which detects whether a high power radiation is performed in case of radio communication, an open/close detector provided to either the first body or the second body wherein the open/close detector connected to the controller to detect an opening/closing of the second body against the first body, at least one switch which switches a connection between the grounded part and at least one of the circuit board and the display, and a controller which controls the switch to selectively establish a ground connection or disconnection between the grounded part and the at least one of the circuit board and the display by using the detecting part and the open/close detector.

In another aspect of the present invention, a method of controlling a mobile communication terminal includes deciding whether the mobile communication terminal is in a radio communication status, deciding whether a high power radiation is performed in case of the radio communication status, and establishing a ground connection between a grounded part and at least one of a circuit board and a display if the high power radiation is performed.

Preferably, the method further includes a step of releasing the ground connection between the grounded part and both of the circuit board and the display if the high power radiation is not performed.

Preferably, the method further includes a step of releasing the ground connection between the grounded part and both of the circuit board and the display if the mobile communication terminal is not in the radio communication status.

According to another aspect, the present invention provides a mobile terminal comprising: a body part including at least one electronic part, and a ground part for selectively grounding the at least one electronic part depending on an opening/closing of the mobile terminal and/or depending on a use of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
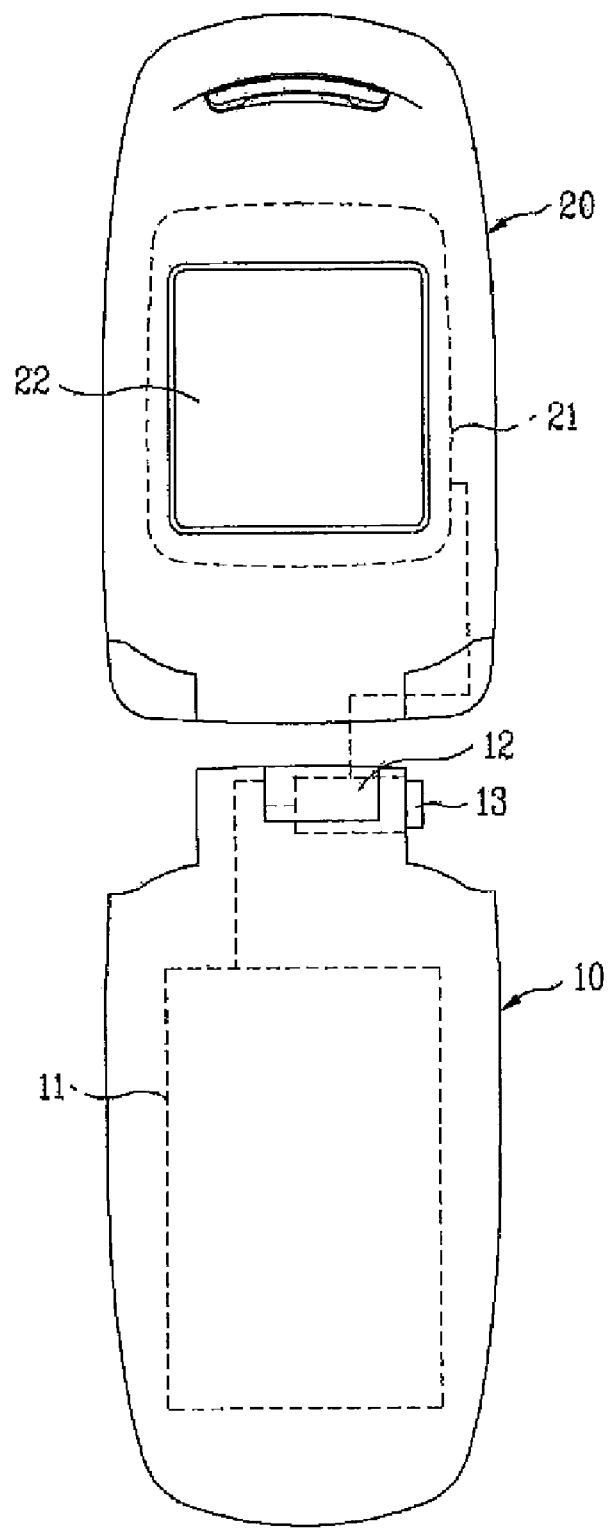
FIG. 1 is a layout of a folder type mobile communication terminal according to a related art, in which a structure for grounding is shown.
Figure 2:
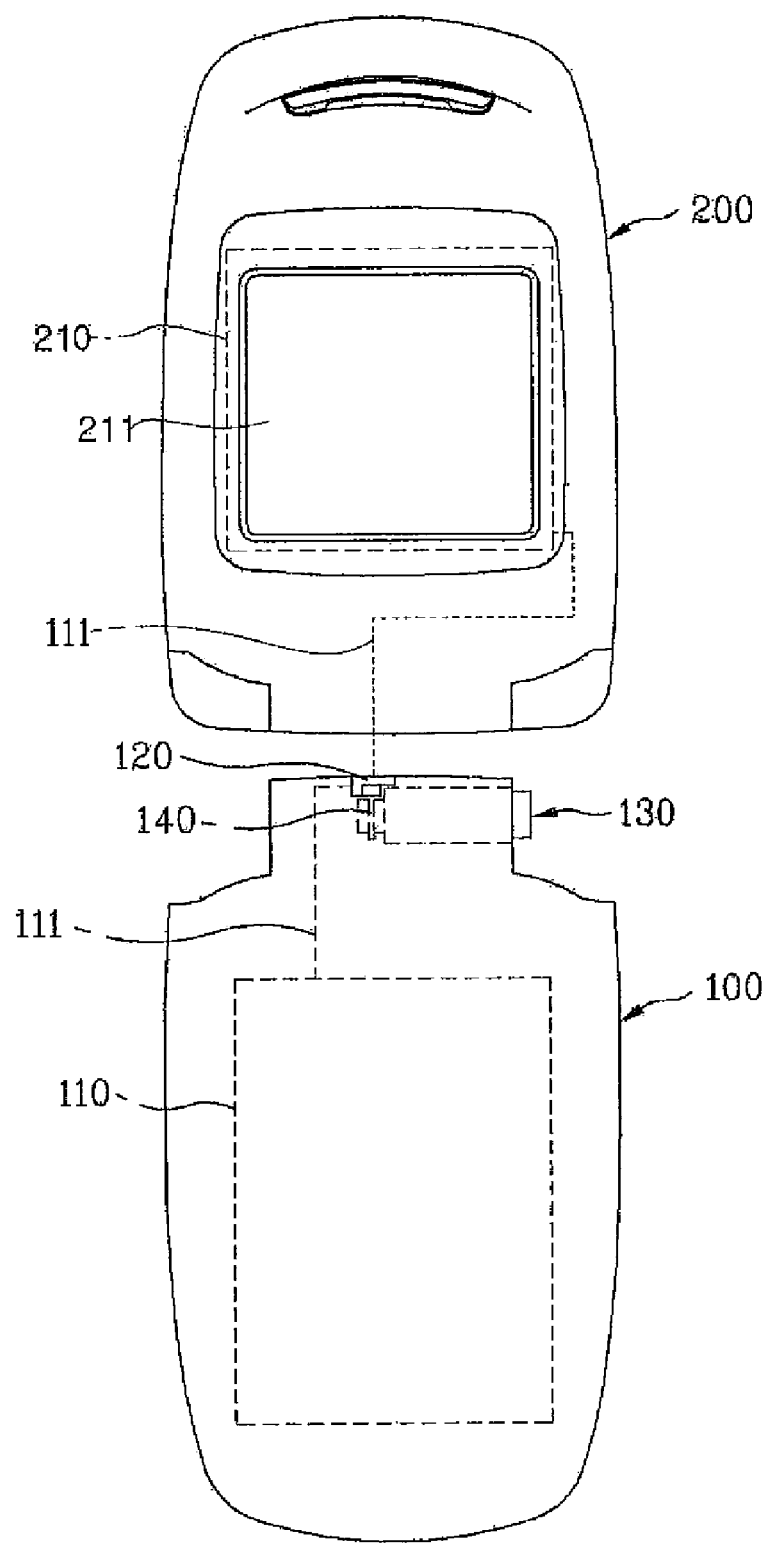
FIG. 2 is a schematic layout of a mobile communication terminal according to one embodiment of the present invention, in which a structure for grounding is shown.

FIG. 2 is a schematic layout of a mobile communication terminal according to one embodiment of the present invention, in which a structure for grounding is shown.

Referring to FIG. 2, the mobile communication terminal according to one embodiment of the present invention includes a first body 100 provided with a circuit board 110 on which various electronic parts required for radio communication are mounted and a second body 200 connected to one side of the first body 100 to open/close the first body 100.

The second body 200 includes a display unit 210 for outputting an image for enabling a user to view prescribed information via a screen, and a window 211 for enabling the display unit 210 to be externally viewed.

The mobile communication terminal according to the present invention shown in FIG. 2 can include the first and second bodies 100 and 200. Alternatively, the mobile communication terminal according to the present invention can include one body having a circuit board 110, a display unit 210, and the like. Alternatively, the mobile communication terminal according to the present invention can include a first body 100 having both a circuit board 110 and a display unit 210 and a second body 200 configured to open/close the first body 100. Other examples are possible.

FIG. 2 shows a folder type terminal configured in a manner where the second body 200 having the display unit 210 rotatably opens/closes the first body 100 having the circuit board 110. Alternatively, the present invention is not limited to one type and is equally applicable to a slide type terminal, a bar type terminal, a swing type terminal, and the like.

A folder type mobile communication terminal is explained with reference to FIGS. 2 to 7 and FIG. 10 for example. And, a slide type mobile communication terminal is explained with reference to FIG. 8 and FIG. 9 for another example.

First of all, a hinge 130, as shown in FIG. 2, is provided to one side of the first body 100 to enable the second body 200 to rotate against the first body 100 by a prescribed angle. The hinge 130 is formed of a conductor entirely or in part and plays a role as a grounded part.

In this case, the grounded part is an element used to reduce influence of electromagnetic waves by scattering electric fields of various parts intensively generating electromagnetic waves such as the circuit board and the display unit. In particular, the intensity of an electric field can be weakened by increasing a length or size of the electric field (V/m).

$$SAR=(\sigma * E^2)/\rho$$

In this case, σ indicates conductivity (s/m), ρ indicates structure density (kg/m^2), and E indicates intensity of electric field (V/m). So, if the electric field is scattered, the intensity of electric field is reduced.

The grounded part has a size enough to scatter an electric field. It is preferable that the size or area of the grounded part is sufficiently large. Yet, since the size of the grounded part provided within the terminal is limited, it is preferable that a maximum size or area is provided to the grounded part within a limited range.

Meanwhile, a conductor 120 is provided to a location in the vicinity of a portion of the first body 100 where the hinge 130 is installed. The conductor 120 is a conductive object formed of a conductive material entirely or in part and has a prescribed size. And, the conductor 120 is electrically connected to the circuit board 110 loaded in the first body 1000 and to the display unit 210 provided to the second body 200.

As an alternative, the conductor 120 may be electrically connected to either the circuit board 110 or the display unit 210. A reference number 1111' indicates a connecting wire for connecting each of the circuit board 110 and/or the display unit 210 to the conductor 120.

A protruding member 140 playing a role as a grounding controlling part is provided to one side of the hinge 130 playing a role as the grounded part. When the second body 200 is opened/closed, the protruding member 140 rotates and selectively contacts the conductor 120, so as to enable the conductor 120 and the hinge 130 to be electrically connected together according to the opening/closing. Thus, it is able to selectively perform the grounding connection for scattering electric fields generated from the circuit board 110 and the display unit 210 to the hinge 130.

The selective grounding connection according to an action of the mobile communication terminal shown in FIG. 2 is explained in more detail with reference to FIG. 3 and FIG. 4 as follows.

Figure 3:
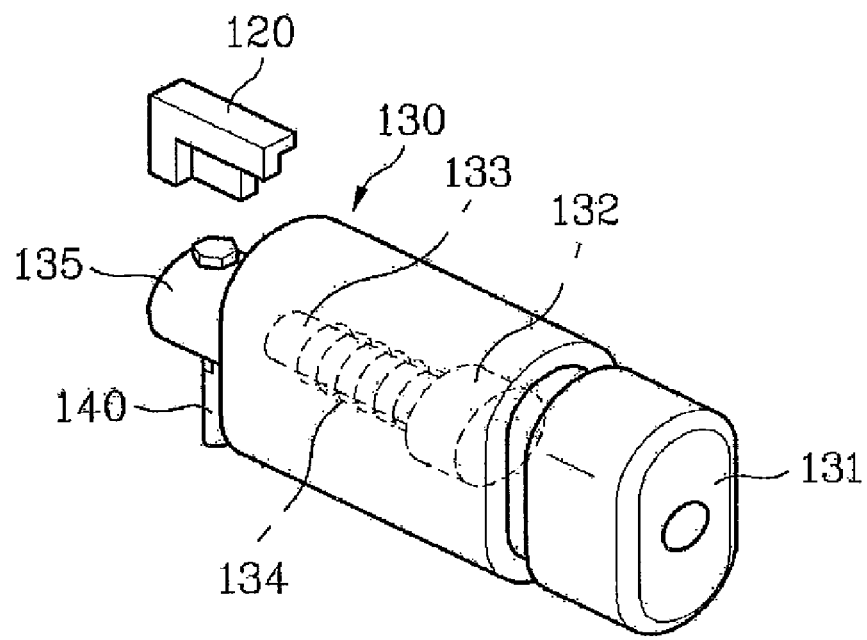
FIG. 3 and FIG. 4 are perspective diagrams of a mobile communication terminal according to one embodiment of the present invention.
Figure 4:
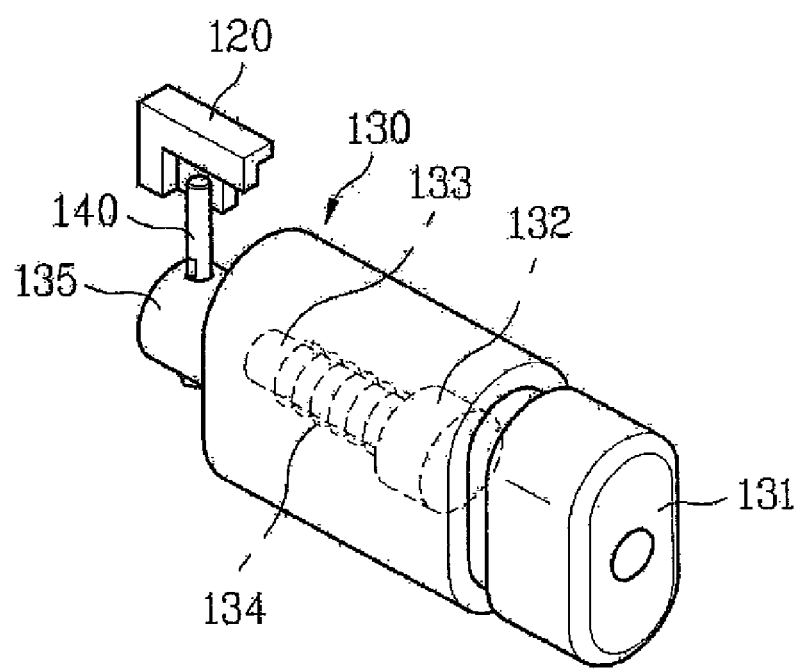

FIG. 3 and FIG. 4 are examples of perspective diagrams of a mobile communication terminal according to one embodiment of the present invention to explain actions of major parts.

FIG. 3 shows a status where the second body 200 is closed against the first body 100 in the mobile communication terminal according to the present invention, and FIG. 4 shows a status where the second body is opened away from the first body 100.

Referring to FIG. 3 and FIG. 4, the hinge 130 includes a fixed cam 131 fixed to one side of the second body (cf. FIG. 2), a hinge shaft 133 provided within the hinge 130 to be rotated by a rotational motion of the second body 200, and a rotational cam 132 provided to an end portion of the hinge shaft 133 to be assembled to the fixed cam 131. In particular, the rotational cam 132 is rotated together with the hinge shaft 133 and then enables the hinge shaft 133 to be fixed to the rotated status.

The rotational cam 132 and the fixed cam 131 (not shown in FIG. 3 or FIG. 4 specifically) are configured to have prescribed type gears engaging with each other, and the fixed cam 131 is in a fixed status. As the rotational cam 132 makes a rotational motion, the engaging gears repeat engagement and disengagement.

The rotational cam 132 is connected to a spring 134 wound on the hinge shaft 133. If the rotational cam 132 is rotated, the gears of the rotational and fixed cams 132 and 131 disengage from each other due to an elastic force from the spring 134 and are then semi-automatically rotated in a direction of the engagement by the elastic force of the spring 134.

Meanwhile, a flange part 135 supporting the hinge shat 133 is provided to the other end portion of the hinge shaft 133. The flange part 135 is rotated together with the hinge shaft 133 as well. That is, as the hinge shaft 133 rotates (e.g., due to the opening or closing of the second body 200), the flange part 135 is rotated in the same direction and manner. Then the protruding member 140 provided within the flange part 135 is rotated in the same direction and manner as the flange part 135, which causes the protruding member 140 to selectively contact the conductor 120 according to the opening and closing of the second body 200 for selective grounding.

The hinge 130 can be entirely formed of a conductive material. Alternatively, each of the hinge shaft 133 and the spring 134 is formed of a conductive material only. Preferably, the protruding member 140 is provided to the conductor portion of the hinge 130, e.g., the end portion of the hinge shaft 133. The protruding member 140 penetrates the flange part 135 to be projected with a prescribed length.

The protruding member 140 is formed of a conductive material. So, both the hinge shaft 133 and the spring 134 are electrically connected to the protruding member 140.

The conductor 120 is provided in the vicinity of the flange part 135 of the hinge 130. The conductor 120 is electrically connected to the circuit board (cf. FIG. 2) and/or the display unit (cf. FIG. 2).

In the state that the mobile communication terminal is in the closed state, the protruding member 140 and the conductor 120, as shown in FIG. 3, are spaced apart from each other and thus no grounding occurs. In case that the mobile communication terminal is open (e.g., the second body 200 is opened away from the first body 100), the protruding member 140 contacts the conductor 120. At this time, since static electricity of the circuit board and/or display unit is distributed to the hinge 130 via the conductor 120 and the protruding member 140 (ground occurs), externally radiating electromagnetic waves are reduced.

If the terminal is closed again, the protruding member 140 is separated from the conductor 120 to cut off (or remove) the ground connection. In this case, since the internal parts of the terminal are not grounded to the grounded part, radiation power of antenna is not insufficient. Hence, radio performance of the terminal is further enhanced.

Figure 5:
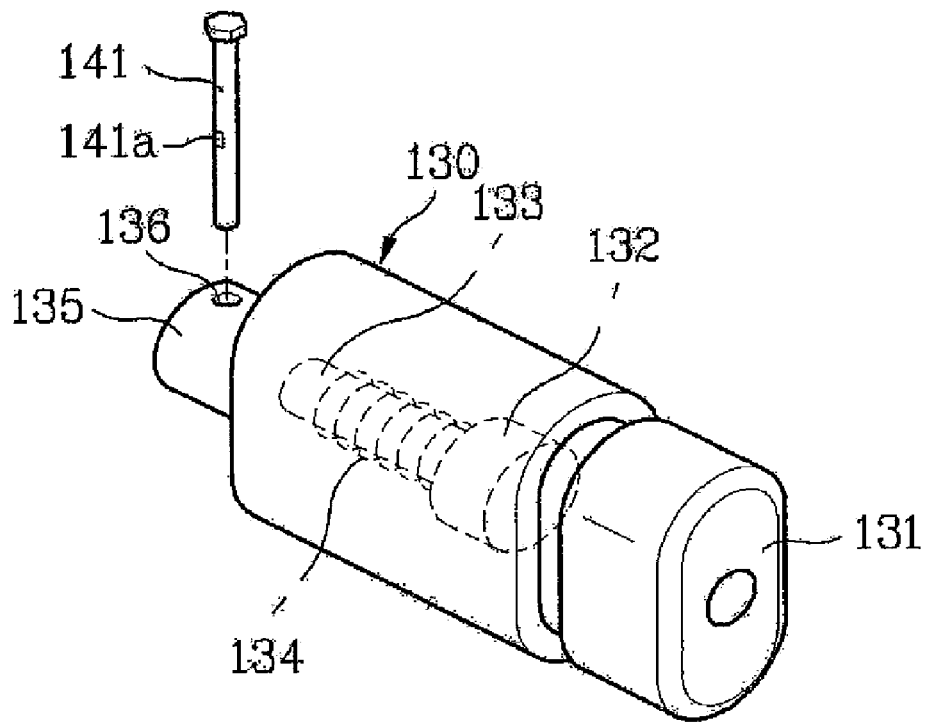
FIGS. 5 to 7 are perspective diagrams of some parts of a mobile communication terminal according to embodiments of the present invention, respectively.
Figure 6:
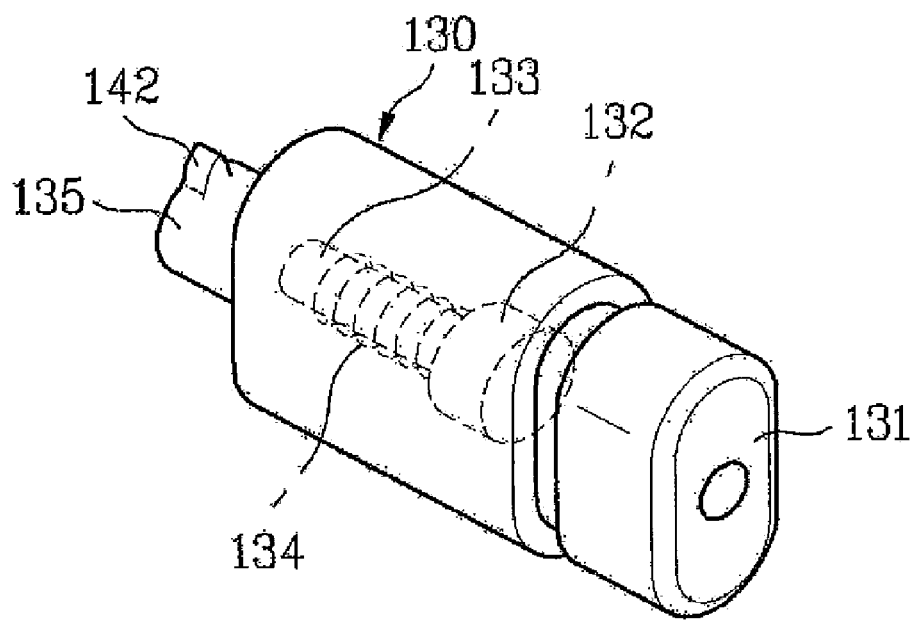
Figure 7:
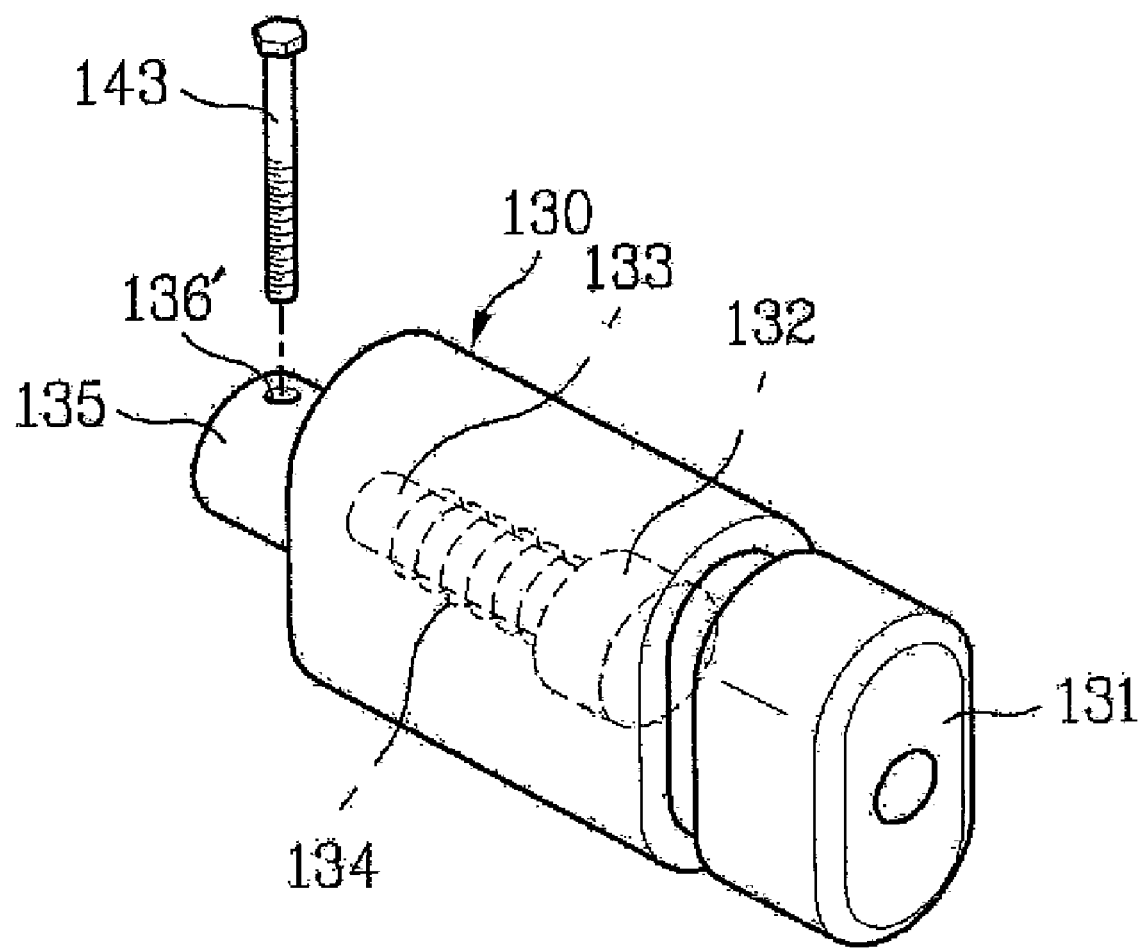

FIGS. 5 to 7 are perspective diagrams of parts of a mobile communication terminal according to embodiments of the present invention, respectively.

Referring to FIG. 5, a hole 136 is provided to the flange part 135 of the hinge 130 to perforate a portion of the hinge shaft 133 formed of the conductive material. A locking stick 141, which is an example of the protruding member, is inserted in the hole 136 to be fixed thereto and then projected with a prescribed length from the other side opposite to the inserted side.

A stopper 141a is provided to one side of the locking stick 141 to enable the locking stick 141 to be locked and fixed to the hole 136. The operation of selectively grounding the electronic parts via the stick 141 by rotation is the same or similar to the grounding operation of the protruding member 140.

Referring to FIG. 6, a projection 142 is projected from one side of the flange part 135 of the hinge 130.

Preferably, the projection 142 is formed of a conductive material. The projection 142 is rotated together with the hinge shaft 133 to enable a selective ground connection to the conductor (cf. FIG. 4). The projection 142 rotates to provide a selective grounding connection, as another example of the protruding member, in the same or similar manner as the other examples of the protruding member.

Referring to FIG. 7, a screwed hole 136' having a female screw shape is provided to the flange part 135. A screw member 143 is locked to the screwed hole 136' by screw locking. The screw member 143 is projected from one side of the flange part 135 to be selectively contacted with the conductor.

Preferably, the screw member 143 is formed of a conductive material. The screw member 143 functions as another example of the protruding member, to provide a selective grounding by rotation.

A mobile communication terminal according to another embodiment of the present invention is explained with reference to FIG. 8 and FIG. 9 as follows.

Figure 8:
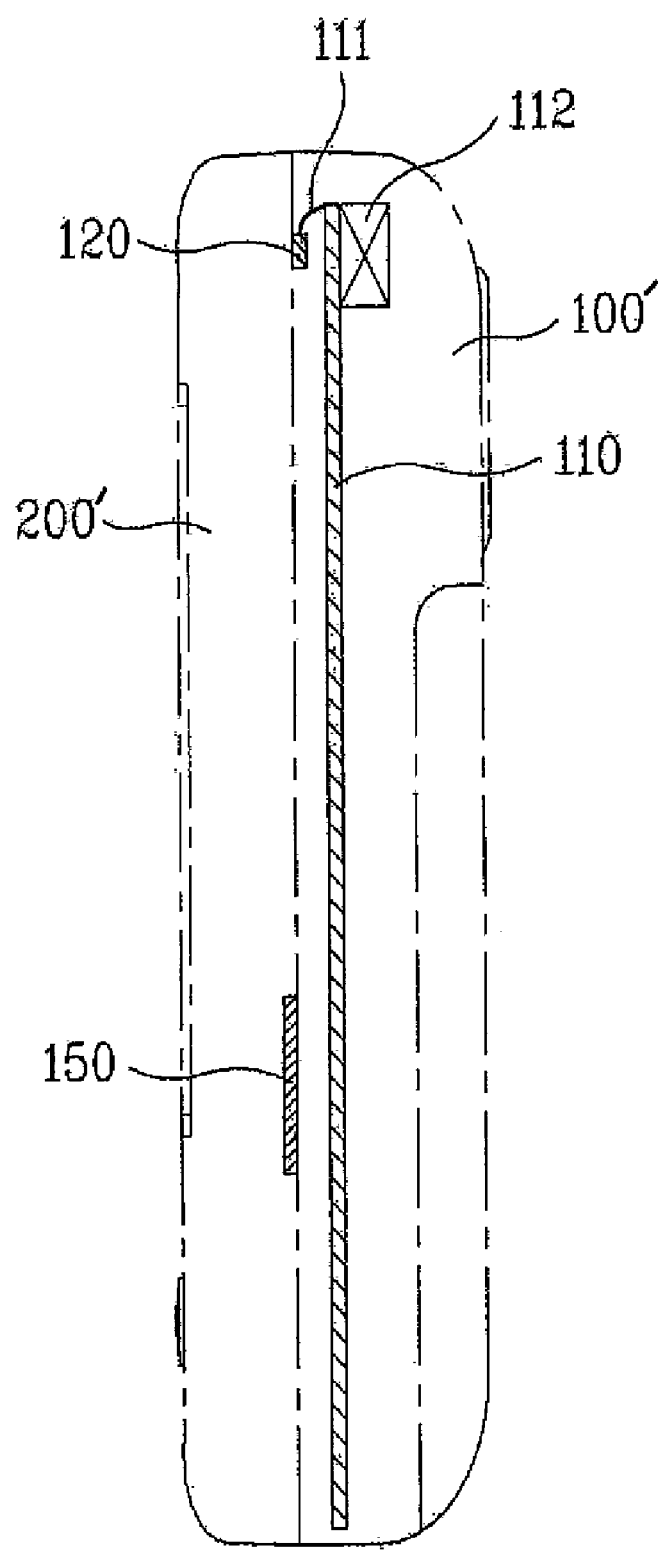
FIG. 8 and FIG. 9 are cross-sectional diagrams of a mobile communication terminal according to another embodiment of the present invention.
Figure 9:
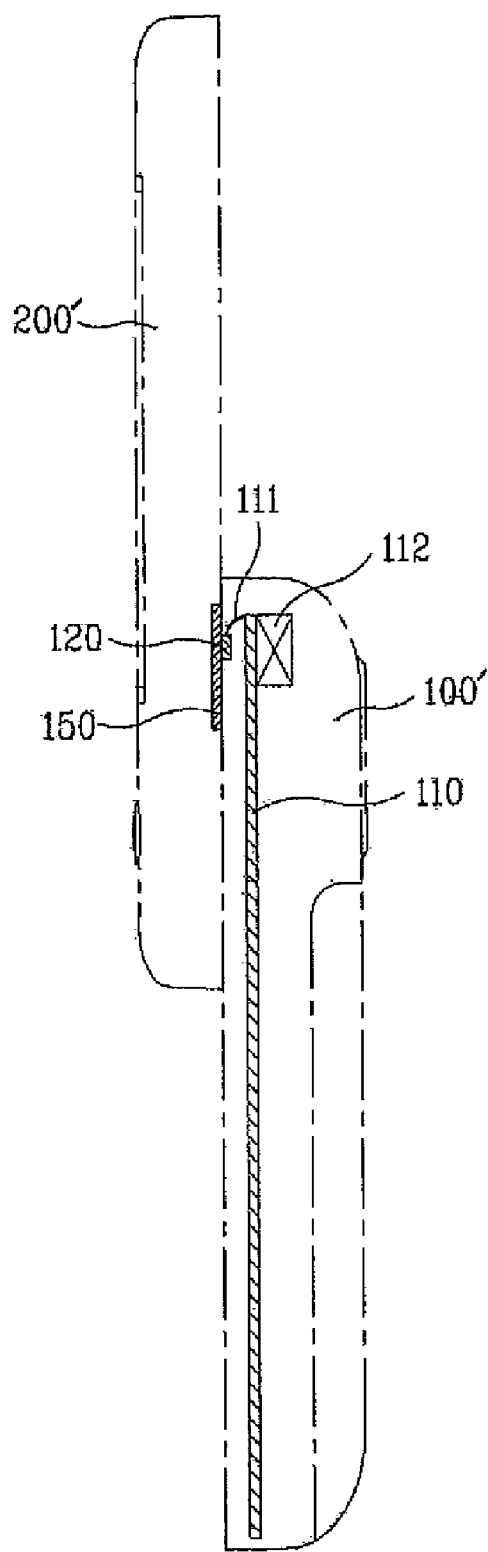

FIG. 8 and FIG. 9 are cross-sectional diagrams of a mobile communication terminal according to another embodiment of the present invention.

Referring to FIG. 8 and FIG. 9, the mobile communication terminal according to another embodiment of the present invention includes a terminal body 100' provided with a circuit board 110, an intenna 112 and the like, and a slide part 200' configured to slide up/down on the terminal body 100' to open/close.

A display unit is provided to one side of the slide part 200' to output prescribed image information.

In the closed state of the mobile terminal, a conductor 120, as shown in FIG. 8, is connected to the circuit board 110 by a connecting wire 111. A grounding plate 150 is provided to a portion of the slide part 200' opposing the terminal body 100'. The conductor 120 and the grounding plate 150 are arranged to be spaced apart from each other with a prescribed distance in-between. While the terminal is in the closed status, a ground connection is not made, which in turn improves the wireless communication ability of the terminal.

If a user slides up/down the slide part 200' to open the terminal as shown in FIG. 9, the slide part 200' moves upward against the terminal body 100' to establish the ground connection between the conductor 120 and the grounding plate 150 coming into contact with each other. Thus, SAR can be reduced in the open state of the terminal.

A mobile communication terminal according to a further embodiment of the present invention is explained with reference to FIG. 10 as follows.

Figure 10:
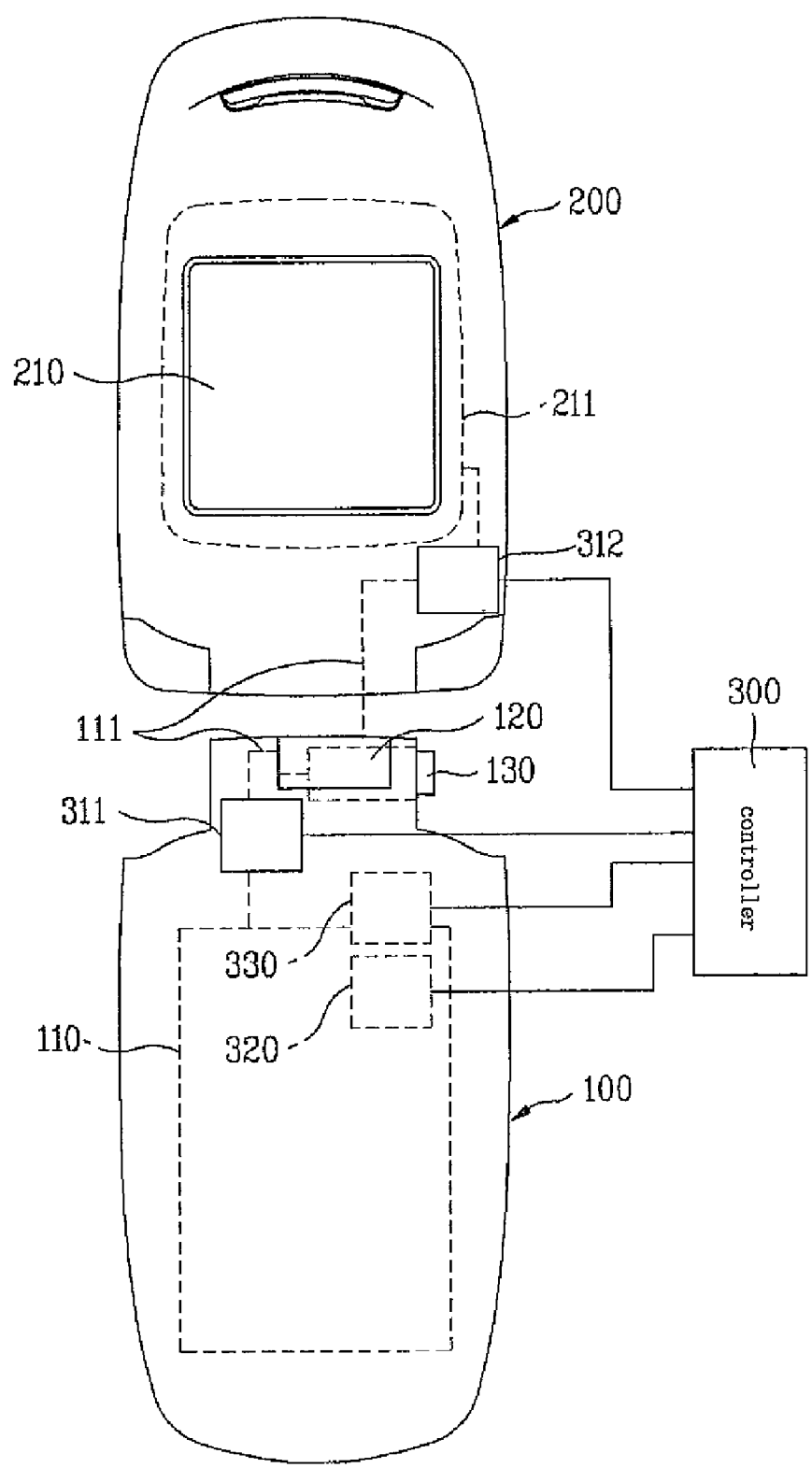
FIG. 10 is a diagram of a mobile communication terminal according to a further/another embodiment of the present invention, in which a structure for grounding is shown.

FIG. 10 is a diagram of a mobile communication terminal according to a further embodiment of the present invention, in which a structure for grounding is shown.

Referring to FIG. 10, the mobile communication terminal according to a further embodiment of the present invention includes a first body 100 provided with a circuit board 110 having prescribed parts mounted thereon, and a second body 200 rotatably assembled to one end portion of the first body 100 to include a display unit 211 for outputting prescribed information. A reference number '211' indicates a window.

A grounded part 120 including a prescribed-sized conductor is provided to one side of the first body 100. The circuit board 110 provided within the first body 100 is electrically connected to the display unit 211 provided within the second body 200 by the grounded part 120.

The connection to the grounded part 120 can be established using a general conductive wire, one of various grounding wires, or a flexible printed circuit hoard (FPCB). A reference number '111' indicates the connecting wire such as the conductive wire, the FPCB, and the like.

It is able to make the grounded part 120 come into contact with the hinge 130 (e.g., the hinge 130 as shown in FIGS. 3-7). Preferably, the hinge 130 is formed of a conductive material entirely or in part. Preferably, the grounded part 120 is contacted with the portion formed of the conductive material.

FIG. 10 shows the embodiment that the grounded part 120 is provided to one side of the first body 100. Alternatively, the grounded part 120 can be provided to the second body 200. Alternatively, the grounded part 120 can be provided to each of the first and second bodies 100 and 200.

Alternatively, the grounded part 120 can be configured to be connected to the circuit board 100 only. Alternatively, the grounded part 120 can be connected to the display unit 211 only or to any other electronic part(s) in the terminal.

The mobile communication terminal according to the present invention, as shown in FIG. 10, is configured to have a grounding controlling part including switches 311 and 312 provided on the connecting line 111 and a controller 300.

The switches 311 and 312 play a role in selectively enabling an electrical connection of the connecting wire 111 to be selectively established. Each of the switches 311 and 312 can include a normally used switching device or a diode.

The normally used switching device includes one of SPDT (single-pole double throw), SPST (single-pole single-throw), and the like. A sort of an ON/OFF switching device is provided on the connecting wire 111 connected to the circuit board 110 and/or the display unit 211. The connecting line 111 is connected or disconnected according to a signal from the controller 300. Thus, a grounding control is enabled.

The embodiment shown in FIG. 10 includes an open/close detector 330 for detecting an opening/closing of the second body 200 against the first body 100, and/or a detecting part 320 for detecting whether a high power output is detected in radio communication.

The open/close detector 330 and the detecting part 320 are electronically coupled to the controller 300 to be controlled by exchanging prescribed signals with the controller 300.

In this case, the open/close detector 330 can include one of various switching devices for detecting the opening/closing of the terminal such as a flip switch, a hall element, a Reed switch, and the like.

The detecting part 320 is a device for detecting whether high power over a prescribed output is outputted from the mobile communication terminal. And, the detecting part 320 can include a HDET (high power detection) circuit or the like.

The switches 311 and 312, as shown in FIG. 10, include a first switch for electrically connecting/disconnecting the circuit board 110 (or any other component) and the grounded part 120, and a second switch 312 for electrically connecting/disconnecting the display unit 211 (or any other component) and the grounded part 120.

Optionally, a single switch can be provided on the connecting wire connecting one of the circuit board 110 and the display unit 211 to the rounded part 120. In case that grounding of each of the circuit board 110 and the display unit 211 is very significant, the switches 311 and 312, as shown in FIG. 10, are provided to the circuit board 110 and the display unit 211, respectively.

Operations of the mobile communication terminal according to the present invention shown in FIG. 10 are explained as follows.

First of all, if a user closes the terminal not to perform radio communication (phone call, data communication, etc.), the controller 300 controls the switches 311 and 312 to release the electrical connection between the grounded part 120 and each of the circuit board 111 and the display unit 112. Hence, radio communication receptibility can be raised/improved.

If the user opens the terminal, the open/close detector 330 detects the opening of the terminal and sends a corresponding signal to the controller 300. The controller 300 decides whether a high power is detected by the detecting unit 320.

In particular, in case that no radio communication for a phone call or the like is made despite the opening of the terminal, SAR causes no problem. Hence, the ground connection is maintained at its cut off state (i.e., no grounding is provided).

In case that the user makes a phone call using the terminal, electromagnetic waves having a predetermined output power is radiated via the antenna. In this case, if the corresponding area lies in a strong electric field, good radio performance can be achieved despite a weak antenna radiation output power. If the corresponding area lies in a weak electric field, sufficient performance can be achieved only if the antenna radiates a high output power. So, if the user makes radio communication in a weak electric field area, electromagnetic waves are considerably generated to raise SAR.

In this case, the detecting part 320 detects a high output power and the control unit controls the switches 311 and 312 to electrically connect the circuit board 110 and the display unit 211 to the grounded part 120 and the hinge 130, respectively. Thus, grounding is achieved to reduce SAR.

The above-explained configuration and operation are applicable to all kinds of grounded terminals as well as to the folder type terminal shown in FIG. 10, the sliding type terminal, etc.

For instance, in case of a slide type terminal, a detecting part for detecting a high output power is provided within the terminal and a switch is provided to such a connecting wire as a PCB, FPCB and the like. If the detecting part detects the high output power, a controller controls a grounding controlling part to establish a ground connection. Hence, SAR is reduced and radio performance can be enhanced.

A method of controlling the mobile communication terminal according to one embodiment of the present invention shown in FIG. 10 is explained with reference to FIG. 11 as follows.

Figure 11:
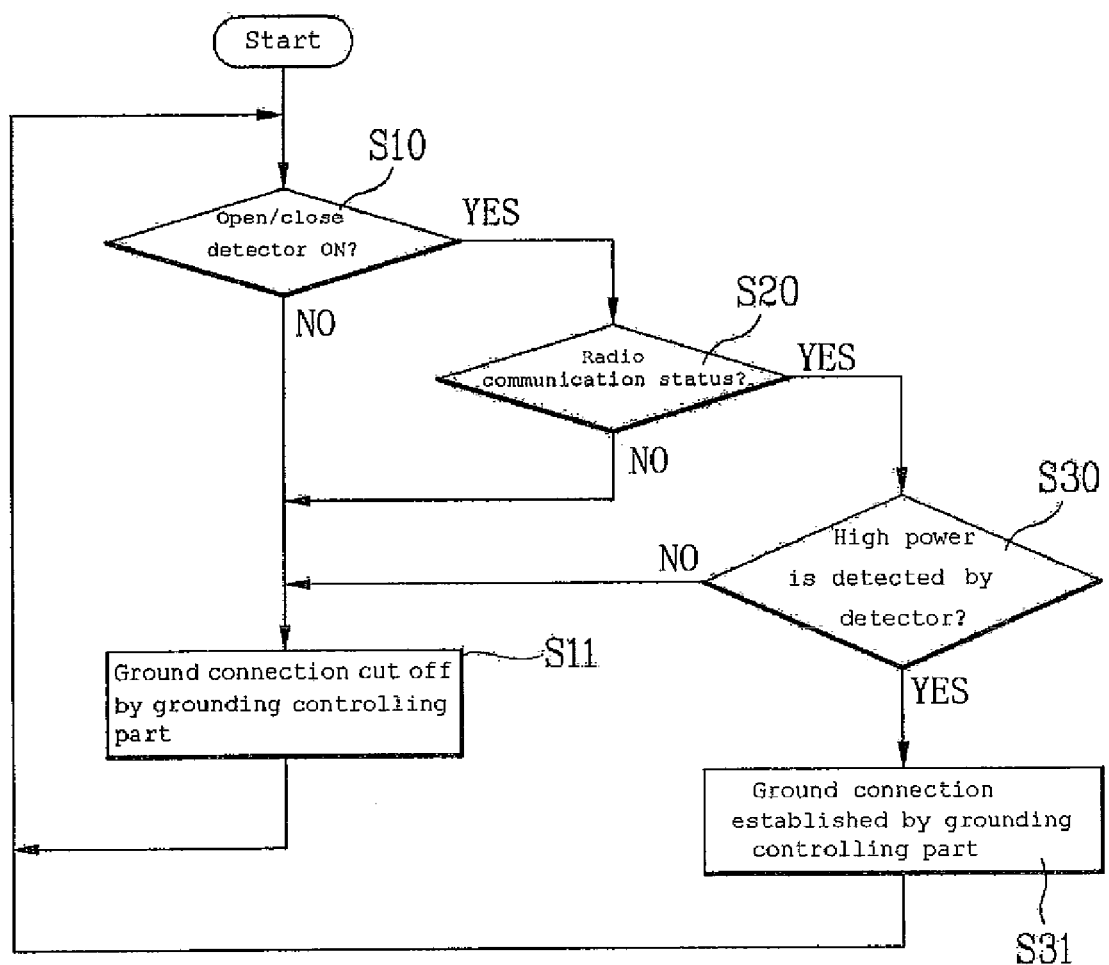
FIG. 11 is a flowchart of a method of controlling a mobile communication terminal according to one embodiment of the present invention.

FIG. 11 is a flowchart of a method of controlling a mobile communication terminal according to one embodiment of the present invention. This method/operation can be implemented in various types of mobile terminals, e.g., the terminals of FIGS. 2-10, as an additional feature.

Referring to FIG. 11, the open/close detector (e.g., the element 330 in FIG. 10) detects an opening or closing of the terminal to decide whether the terminal is currently opened or closed (S10).

If the terminal is currently closed at step S10, the switch (es) cuts off the ground connection by using a grounding controlling part to enhance radio performance (S11). For instance, the protruding member 140 does not contact the conductor 120 to provide the grounding connection and/or the switch(es) 312/311 may be switched so as not to electrically disconnect the wires 111 so as not to provide the grounding connection.

If the terminal is currently opened at step S10, the controller decides whether a user is using radio communication, e.g., making a phone call (S20).

If the terminal is not in a radio communication status, step S11 is executed. If the user is making a phone call or in a radio communication in some other way, the controller decides whether a high output power is detected by the detecting part (e.g., the detection part 320) (S30).

If the high output power is not detected from the terminal, the controller executes step S11. In this case, since SAR is almost insignificant, radio communication performance can be further enhanced by cutting off the grounding.

Meanwhile, if the controller detects the high output power via the detecting part in step S30, the controller (e.g., the controller 300) controls the switch(es) to establish the ground connection as discussed above. Hence, SAR can be reduced (S31).

By repeating a series of the above steps, the mobile communication terminal enables the grounding only if the high output power is detected. If the high output power is not detected regardless of SAR, the ground connection is cut off to enhance radio communication performance.

According to the embodiments, some examples of the mobile communication terminal are a mobile phone, a PDA, a smart phone or device, a pager device, etc. The mobile terminals can include any other known components. Further, the selective grounding operation of the present invention is applicable to one or more bodies of the terminal, each of which may include one or more electronic parts such as a display, PCB, etc.

Accordingly, the present invention provides the following effects or advantages.

First of all, the mobile communication terminal according to the present invention discriminates a case where SAR is a big deal from a case where SAR is not a big deal. If the terminal is closed or if SAR is no big deal despite using the terminal, the ground connection is cut off to enhance radio performance. The ground connection may be established only if SAR is a big deal/significant. Hence, SAR is lowered.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
a first body including a circuit board having radio communication parts mounted thereon;
a second body configured to open/close the first body, and the second body having a display to output image of prescribed information;
a conductor electrically connected to the circuit board and the display;
a hinge configured to rotate the second body against the first body, the hinge entirely formed of a conductive material, the hinge including:
a hinge shaft;
a rotational cam provided to an end portion of the hinge shaft; and
a flange part provided to the other end portion of the hinge shaft; and
a ground controlling part including a protruding member provided to the flange part, and configured to selectively connect the hinge to the conductor according to the rotation of the hinge,
wherein the ground controlling part further includes a first switch configured to electrically connect/disconnect the circuit board and the conductor according to a high power radiation in a radio communication status,
wherein the hinge is spaced apart from the conductor,
wherein the protruding member extends at an angle to a longitudinal axis of the hinge shaft, and
wherein when the first body is closed, the hinge and the protruding part are not in contact with the conductor, and when the first body is opened, the protruding member rotates with the hinge in order to electrically connect the hinge to the conductor.

2. The mobile communication terminal of claim 1, wherein the hinge comprises a hole provided on the flange part the hinge, and
wherein the protruding member comprises a locking stick inserted in the hole and projecting with a prescribed length.

3. The mobile communication terminal of claim 1, wherein the protruding member comprises a protrusion provided on the flange part of the hinge and projecting with a prescribed distance.

4. The mobile communication terminal of claim 1, wherein the hinge comprises a female screw hole provided in the flange part of the hinge, and
wherein the protruding member comprises a male screw locked to the female screw hole by screw locking and projecting with a prescribed length.

5. The mobile communication terminal of claim 2, wherein the locking stick further comprises a stopper provided on a portion of the locking stick to fix the locking stick to the hole.

6. The mobile communication terminal of claim 1, wherein the grounding controlling part further comprises:
at least one switch configured to switch a connection between the grounded part and at least one of the circuit board and the display; and
a controller configured to control the at least one switch to selectively establish a ground connection or disconnection between the grounded part and at least one of the circuit board and the display.

7. The mobile communication terminal of claim 6, further comprising:
a detecting part connected to the controller, and configured to detect whether a high power radiation is performed in case of a user's radio communication,
wherein the controller is operated to establish a ground connection if the high power radiation is performed according to the detection result of the detecting part.

8. The mobile communication terminal of claim 1, wherein the grounding controlling part further comprises:
a detecting part configured to detect whether a high power radiation is performed in case of radio communication;
an open/close detector provided to either the first body or the second body, wherein the open/close detector is connected to a controller configured to detect an opening/closing of the second body against the first body;
at least one switch configured to switch a connection between the grounded part and at least one of the circuit board and the display; and
the controller configured to control the at least one switch to selectively establish a ground connection or disconnection between the grounded part and at least one of the circuit board and the display by using the detecting part and the open/close detector.

* * * * *